United States Patent [19]

St Ville et al.

[11] Patent Number: 5,428,701

[45] Date of Patent: Jun. 27, 1995

[54] ELECTRO-OPTICAL TUNABLE FILTER

[75] Inventors: Laurence J. St Ville, London; Nicholas J. Parsons, Colchester; Stuart N. Radcliffe, Brentwood, all of United Kingdom

[73] Assignee: GEC-Marconi Limited, Stanmore, United Kingdom

[21] Appl. No.: 127,738

[22] Filed: Sep. 28, 1993

[30] Foreign Application Priority Data

Sep. 28, 1992 [GB] United Kingdom ............... 9220430

[51] Int. Cl.$^6$ ............................................... G02B 6/26
[52] U.S. Cl. ............................................... 385/40
[58] Field of Search ............................... 385/1-3, 385/8-11, 29, 40, 41

[56] References Cited

U.S. PATENT DOCUMENTS

| | | | |
|---|---|---|---|
| 4,327,971 | 5/1982 | Kondo et al. | 350/388 |
| 4,415,226 | 11/1983 | Verber et al. | 385/10 |
| 4,422,088 | 12/1983 | Gfeller | 385/40 |
| 4,966,431 | 10/1990 | Heismann | 385/11 |
| 4,988,169 | 1/1991 | Walker | 385/11 |
| 5,218,653 | 6/1993 | Johnson et al. | 385/7 |

FOREIGN PATENT DOCUMENTS

| | | |
|---|---|---|
| 0443839 | 2/1991 | European Pat. Off. |
| 0473440 | 8/1991 | European Pat. Off. |

OTHER PUBLICATIONS

I.E.E.E. Journal of Quantum Electronics, vol. QE-24, No. 1, Jan., 1988, pp. 83-93, "Wavelength-Tunable Electrooptic Polarization Conversion in Birefringent Waveguides", F. Heismann et al.

I.E.E.E. Photonics Technology Letters, vol. 3, No. 3 Mar., 1991, pp. 219-221, "Mirror-Folded Polarization-Independent Wavelength Filter", F. Heismann et al.

Electronics Letters, vol. 29, No. 2, Jan. 21, 1993, pp. 157-159, "Lithium Niobate Electro-Optic Tunable Filter With High Sidelobe Suppression", I. R. Croston et al.

Proceedings of the Spie—Integrated Optical Circuit Engineering III, vol. 651, Apr. 1986, pp. 139-146, "Spatially-Variant Coupling Design for Co-Directional Mode-Converting Bandpass Filters", D. P. Morgan.

Primary Examiner—Rodney B. Bovernick
Assistant Examiner—John Ngo
Attorney, Agent, or Firm—Spencer, Frank & Schneider

[57] ABSTRACT

An optical filter comprises a light waveguide and an electrode structure located adjacent the waveguide. The electrode structure comprises a first ladder arrangement having a plurality of rungs disposed along the length of the waveguide and spaced apart from each other, each rung of the first ladder arrangement comprising a plurality of interdigitated electrode pairs. A second ladder arrangement has a plurality of rungs interleaved with the rungs of the first ladder arrangement and spaced apart from each other by a second pitch spacing that is different from the first pitch spacing.

9 Claims, 5 Drawing Sheets

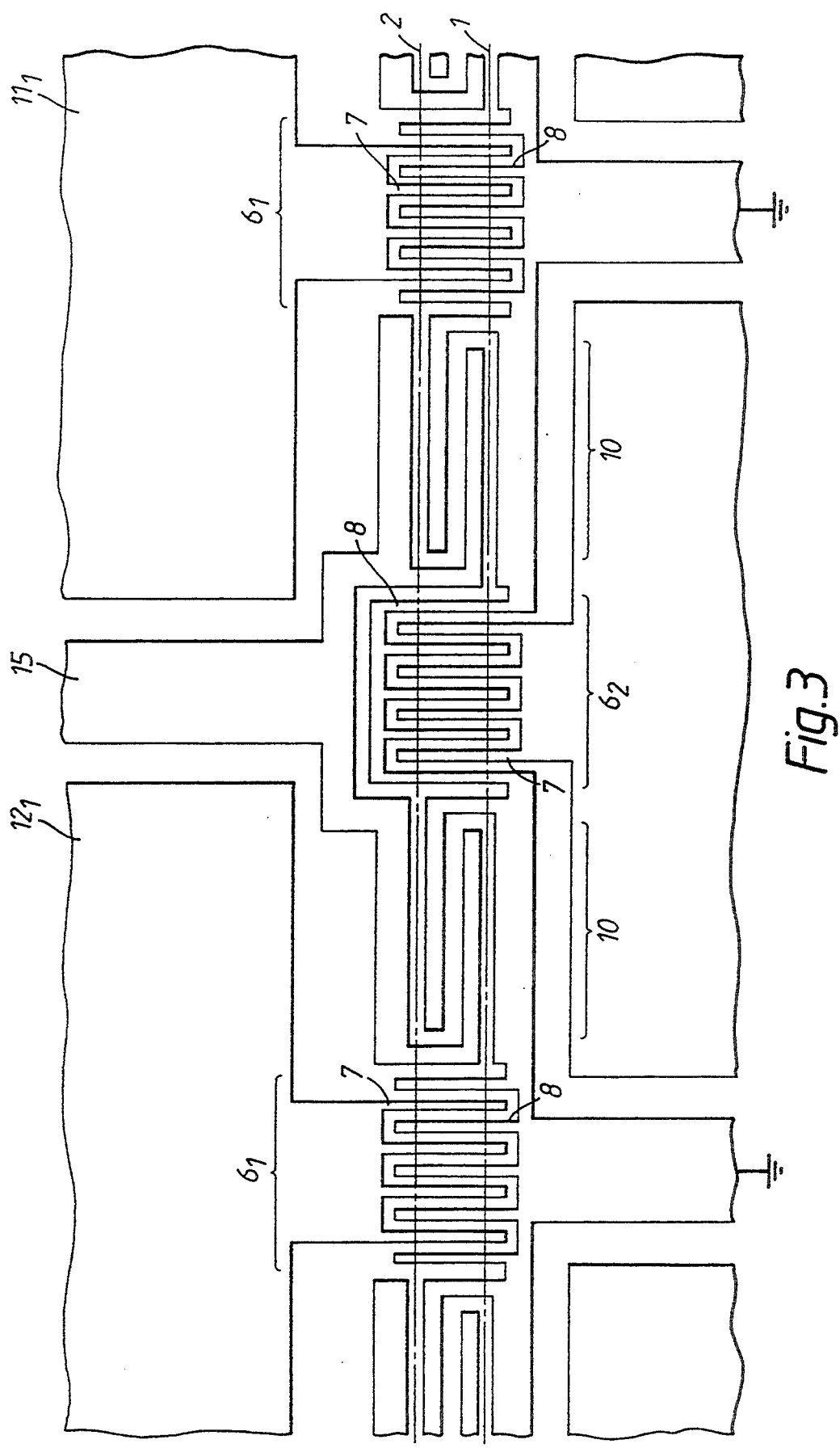

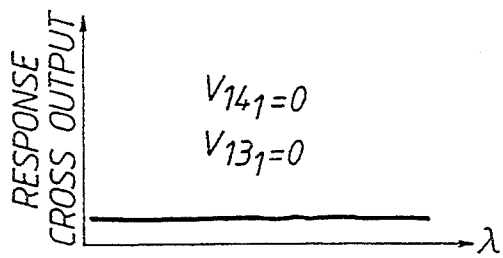
Fig.4a(i)
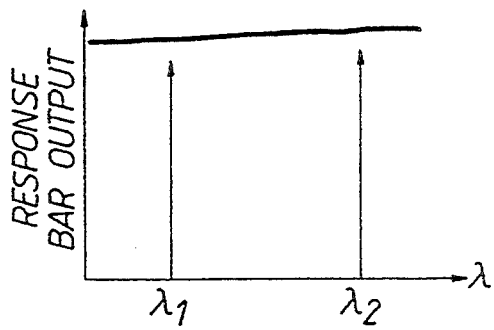
Fig.4a(ii)
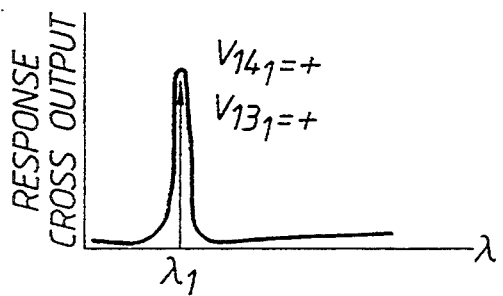
Fig.4b(i)
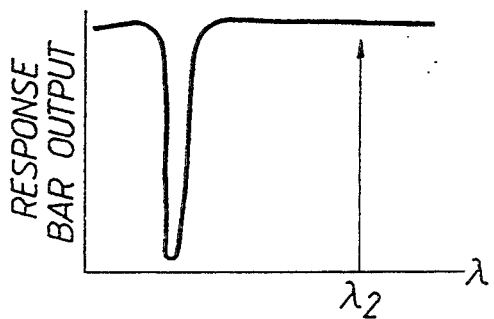
Fig.4b(ii)
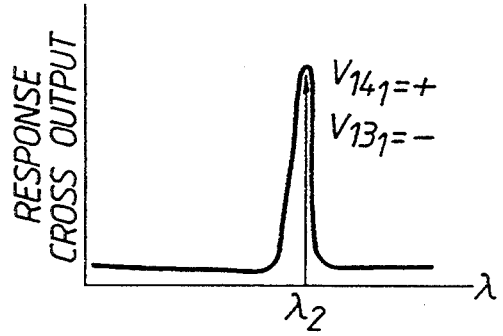
Fig.4c(i)
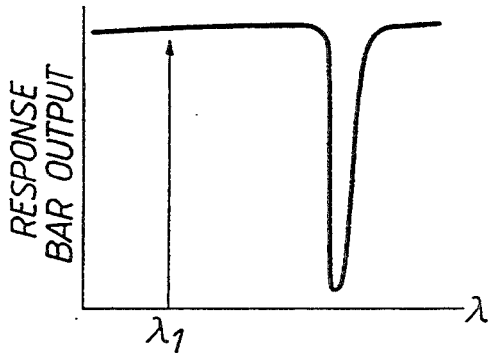
Fig.4c(ii)
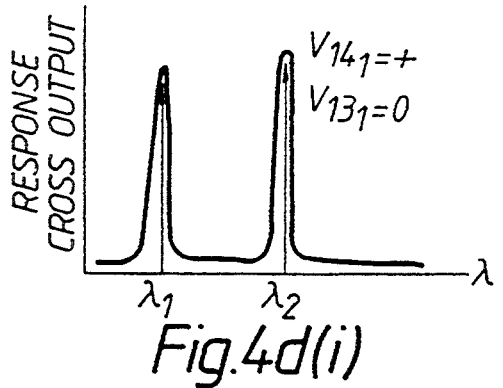
Fig.4d(i)
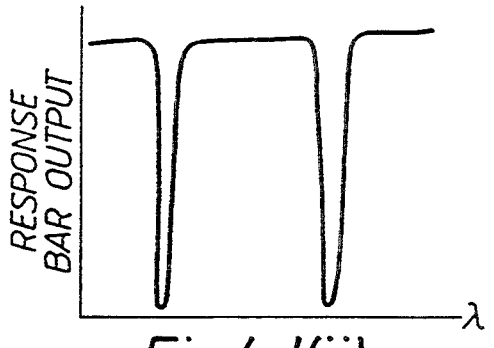
Fig.4d(ii)

ELECTRO-OPTICAL TUNABLE FILTER

BACKGROUND OF THE INVENTION

This invention relates to an optical filter, and in particular to a narrow band filter.

Narrow band optical filters have been proposed comprising a polarisation diversity arrangement including a polarisation sensitive four port coupler on the input side, a polarisation transformer and a further similar coupler on the output side. Such couplers have the property, achieved by suitable choice of coupled length and guide spacing, that they exhibit "cross" transmission for TM polarisation (i.e. the signal crosses over to the other waveguide) and "bar" transmission for TE polarisation (i.e. the signal remains on the same waveguide) or vice versa. Thus if a source of mixed polarisation is applied to one port, TE and TM components will be separated at the output ports. If this is followed immediately by a second such coupler the components will recombine to appear at one output port only. However, if a polarisation converter or transformer is placed in between the two couplers, those components of the signals at the frequency of operation which are changed in polarisation will appear at the one output port of the second coupler.

A known polarisation converter comprises a pair of waveguides formed, for example, in a birefingent material such as X-cut Y-propagating Lithium Niobate. With no applied electric field, the TE and TM components are orthogonal to one another and propagate along the waveguide with different velocities. This gives rise to a characteristic beat wavelength where the two modes are in phase with one another. If an electric field is applied in the X-direction across the waveguide, the new "rotated" birefringence destroys the orthogonality of the two modes and each component splits into new "rotated" TE and TM components. By repeatedly applying the electric field at a spacing equal to the beat wavelength, the coupling between TE and TM components builds up in phase and one polarisation mode can be converted into the other. An electrode structure comprising a finite number of interdigitated electrodes spaced apart in the manner described above gives rise, in the frequency domain F to a sinc (sinF/F) response.

It has also been proposed to provide a ladder arrangement of spaced apart rungs, where each rung comprises a plurality of interdigitated electrode pairs spaced apart in the manner described above. This has the effect, in the frequency domain, of providing the device with a comb like response. A known way of tuning the filter is by applying a Z-directed E field—i.e. such that an electrode gap extends in parallel to the waveguide. This has the effect of changing the birefringence and thus the beat wavelength.

It is one object of the invention to increase the wavelength range over which a device of this general type may be operated.

BRIEF SUMMARY OF THE INVENTION

In one aspect this invention provides an optical filter comprising a light waveguide and an electrode structure located adjacent the waveguide, the electrode structure comprising a ladder arrangement of a plurality of rungs spaced apart from each other along the length of the waveguide, each rung comprising a plurality of interdigitated electrode pairs, the electrode structure being such that different control voltages can be applied to different rungs.

The ability to apply differing voltages to differing rungs confers several advantages. For example if the structure is such that different control voltages can be applied to adjacent rungs, i.e. each set of alternate rungs, this allows the filter to be switched between a condition in which all rungs are biassed the same way and another condition in which adjacent rungs are reverse biassed with respect to each other. This has the effect of introducing a 180° shift in the effect of the adjacent rungs moving the operational wavelength to a second value.

Alternatively, it has been found that by applying a control voltageof zero volts to alternate rungs whilst biassing the remaining rungs the same way (i.e. all positive or all negative), the filter will pass both wavelengths. In this way the device can be used to route two channels, each centered on one of the two operational wavelengths.

It is preferred that phase shifter electrodes are disposed between adjacent rungs, whereby alteration of the control voltage applied to the phase shifter electrodes alters the birefingence of the waveguide.

In another aspect this invention provides an optical filter comprising a light waveguide and an electrode structure located adjacent the waveguide, the electrode structure comprising a first ladder arrangement of a plurality of rungs spaced apart from each other along the length of the waveguide by a first pitch spacing, each rung comprising a plurality of interdigitated electrode pairs, the structure comprising a second ladder arrangement of spaced apart rungs interleaved with the first arrangement, with the pitch of the rungs in the second arrangement differing from that of the first.

The different pitch ensures that both the operational wavelengths and the spacing apart of the harmonics differ for each arrangement.

Switching in one or other of the ladder arrangements can accordingly increase the tuning range of the filter, while the fact that the two (or more) ladder arrangements are interleaved ensures that the waveguide is not unnecessarily long, which is important in reducing optical losses and producing a compact device.

This feature may be combined with the before mentioned feature to provide a filter having an especially wide tuning range. When a control voltage of zero volts is applied to alternate rungs of each ladder, the device can be configured as a multiple wavelength channel router to pass a number of different wavelengths equal to twice the number of ladders.

It is preferred that the number of electrode pairs within each rung is greater within those rungs disposed towards the centre of the respective ladders than those at the ends. Weighting the electrodes in this way suppresses the lobes on each side of each main spectral peak.

BRIEF DESCRIPTION OF THE DRAWINGS

In order that the invention may be well understood, embodiments thereof will now be described by way of example with reference to the accompanying diagrammatic drawings, in which;

FIG. 3 is a view of an enlarged scale of part of the structure shown in FIG. 2;

FIGS. 4a(i)–4d(ii) shows the frequency response that can be generated from a single ladder for each of a number of rung bias conditions.

DETAILED DESCRIPTION OF THE PREFERRED EMBODIMENTS

Figure 1:
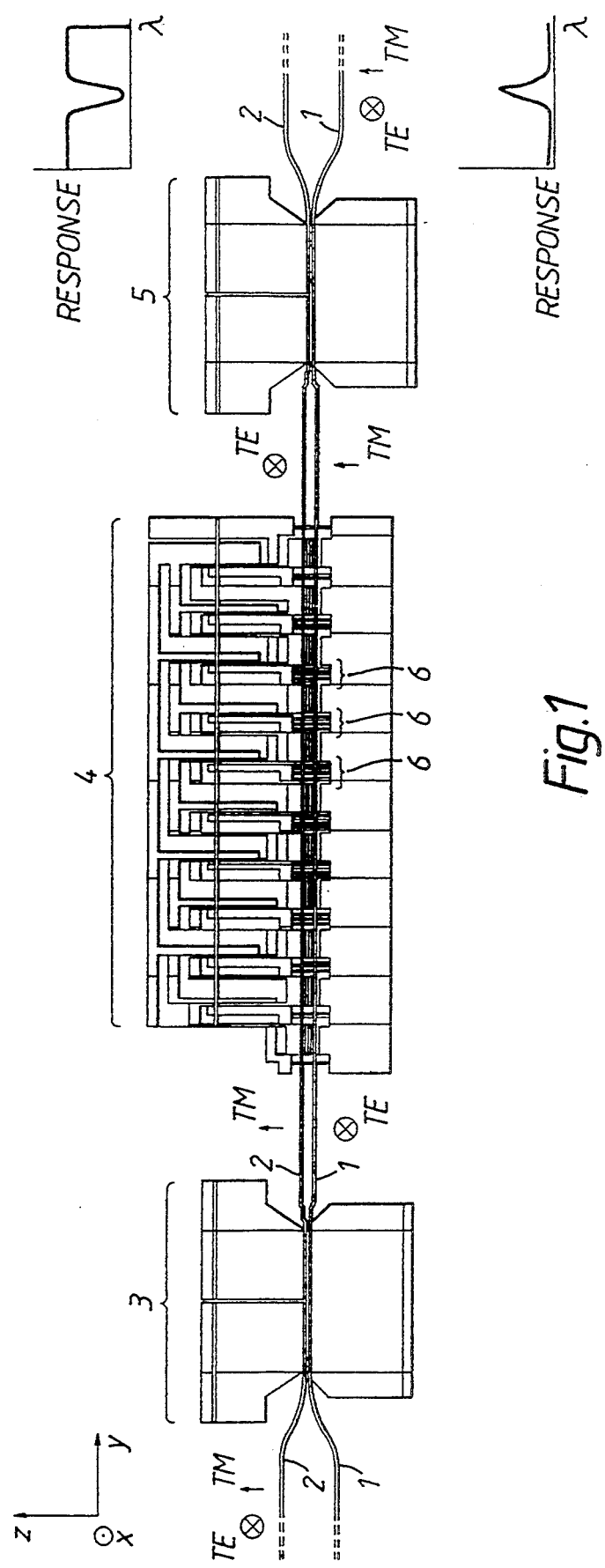
FIG. 1 is a plan view of a filter according to one embodiment of the invention.

FIG. 1 shows a filter or polarisation diversity arrangement comprising a pair of waveguides 1, 2 disposed in side by side relation within an electro optic crystal material such as X-cut Y-propagating Lithium Niobate. An electrode structure comprises a polarisation sensitive four-port coupler 3, a wavelength sensitive polarisation transformer 4 and a further four-port coupler 5. The coupler 3 has the effect of splitting the polarisation components TE and TM of broadband light provided on one of its inputs 2 such that, as shown, light in the TM mode remains in waveguide 2, while light in the TE mode is coupled into waveguide 1. The polarisation transformer 4 has the effect of transforming light at the frequency of operation only, such that, as shown, light in the TM mode is transformed onto waveguide 2, while light in the TE mode is transformed onto waveguide 1. The coupler 5 then operates to recombine light at the frequency of operation in the two modes such that both are provided on waveguide 1, the "cross" output, (i.e. the signals cross over to the other waveguide, with respect to the input) while the remaining frequency components are dumped on waveguide 2, the "bar" output (i.e. the same waveguide as the input). The polarisation transformer 4 comprises a ladder arrangement of a plurality of rungs 6, where each rung 6 comprises a plurality of interdigitated pairs of electrodes 7, 8 (shown best in FIG. 3) with a spacing apart or pitch of adjacent electrode pairs approximating the beat wavelength of light in the two polarisation modes TE and TM. The electrodes 7, 8 provide an electric field parallel to the direction (the Y-direction) in which the light propagates along the waveguides 1, 2. Although not shown clearly in FIG. 1 electrodes 7 of different rungs 6 can be connected to different control voltages, as will be explained later on. Electrodes 8 are connected to ground. Phase shifter electrodes 10 are disposed between the rungs 6 and these are operative to apply an electric field at right angles (the Z-direction) to the direction of propagation of light in the waveguides. Application of a voltage in the Z-direction has the effect of changing the birefringence and thus the beat wavelength.

Figure 2:
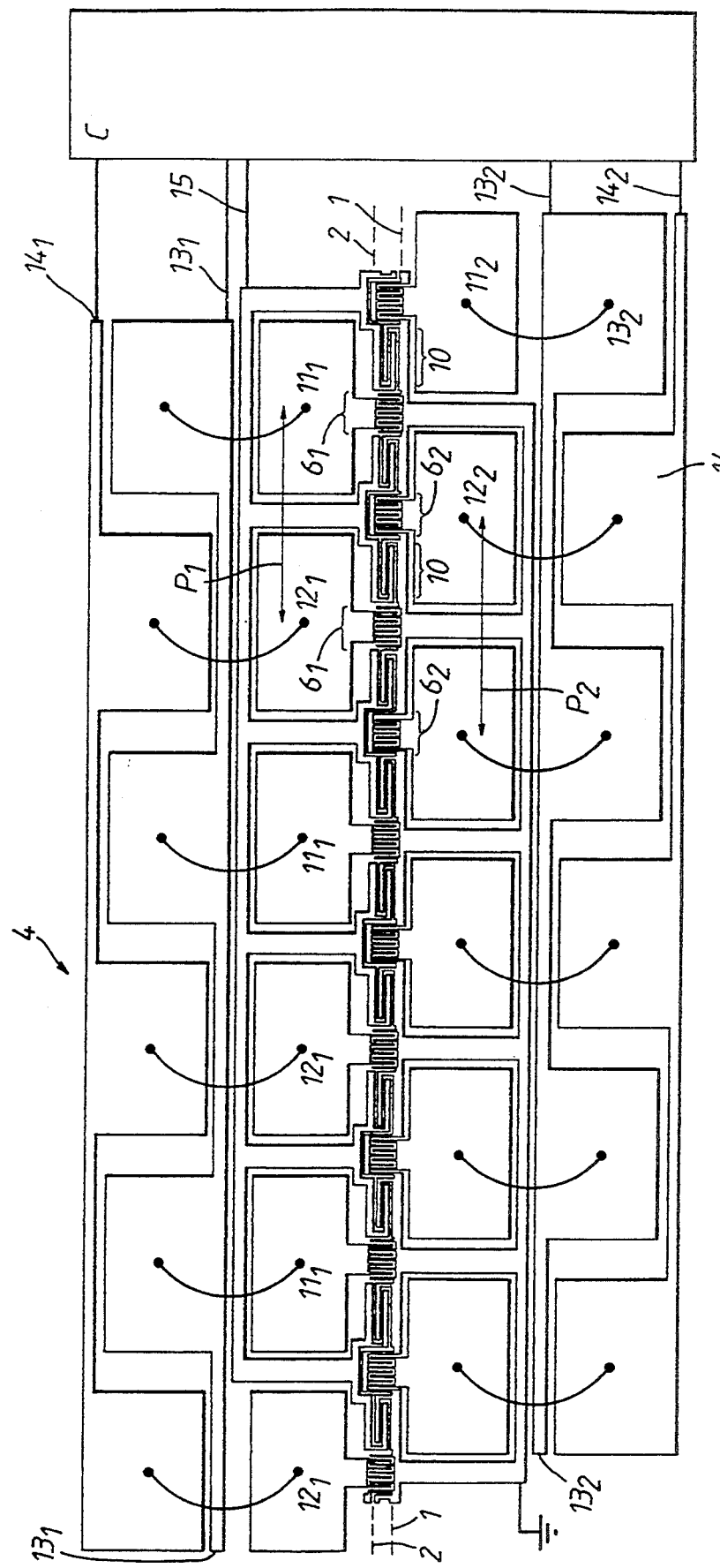
FIG. 2 is a plan view showing the electrode structure of part of a filter according to another embodiment of the invention.

FIG. 2 shows part of another electrode structure according to the invention. Two ladder arrangements are provided with the rungs $6_1$ of one ladder being interleaved with rungs $6_2$ of the other. Although not shown clearly in FIG. 2, the spacing apart or pitch $P_1$ of the rungs in the first ladder arrangement differs from the pitch $P_2$ of those in the second arrangement. Alternate control electrodes $11_1$, $11_2$, $12_1$, $12_2$ within each arrangement are connected to a common control line $13_1$, $13_2$, $14_1$, $14_2$ respectively which are each connected to a controller C for applying control signals to the electrodes. In this way, the control voltages applied to adjacent rungs in each ladder arrangement can differ. Line 15 is provided for applying a tuning bias to the phase shifter electrodes 10. In an alternative embodiment the two ladders need not be interleaved with each other, but can be arranged serially.

The embodiment shown in FIG. 1 lacks the dual ladder arrangement of the embodiment of FIG. 2, but does show another feature of the invention namely the weighting of the numbers of interdigitated electrodes 7, 8 within each rung 6 such that the rungs towards the centre of the arrangement have more electrode pairs 7, 8 than those at the ends. The weighting may be the well known Taylor weighting used for a similar purpose in Radar design. In an example, with 12 rungs in a ladder, electrode pairs were provided in the series 5, 8, 15, 23, 29, 33, 33, 29, 23, 15, 8, 5. Sidelobe suppression was reduced to a level of −30 dB, compared to a level of −9 dB when no such weighting was applied.

FIG. 4 shows a typical frequency response from the outputs of waveguides 1 and 2 for each of a variety of control voltage conditions applied to the rungs $6_1$ of the first ladder arrangement, and with a continuum of signals being applied to waveguide 2.

FIGS. 4a(i) and (ii) show the response on each output with a zero volt control voltage applied to all rungs. No signals cross over to waveguide 1, so that the full spectrum remains on the "bar" output, waveguide 2. FIGS. 4b(i) and (ii) show a typical response when identical positive (or negative) bias voltages are applied to all rungs in one ladder. A narrow band filtering effect is provided, centred on wavelength $\lambda_1$.

As previously discussed, the use of a number of spaced apart rungs gives rise to a comb-like response in the frequency domain, where the spacing is dependent upon the rung spacing. Applying positive and negative biassing to adjacent rungs introduces a phase shift of 180° into the frequency response, generating a further set of responses interleaved with the first. FIGS. 4c(i) and (ii) show the effect of applying positive and negative voltages to adjacent rungs, where the main response $\lambda_1$ is shifted to $\lambda_2$.

It has been found that applying zero volts to alternate rungs gives a response as shown in FIGS. 4d(i) and (ii), where the filter will pass both signals $\lambda_1$, and $\lambda_2$. The filter can thereby be used as a channel routing device or space switch with the capability of passing two separate channels for each available ladder.

Figure 5:
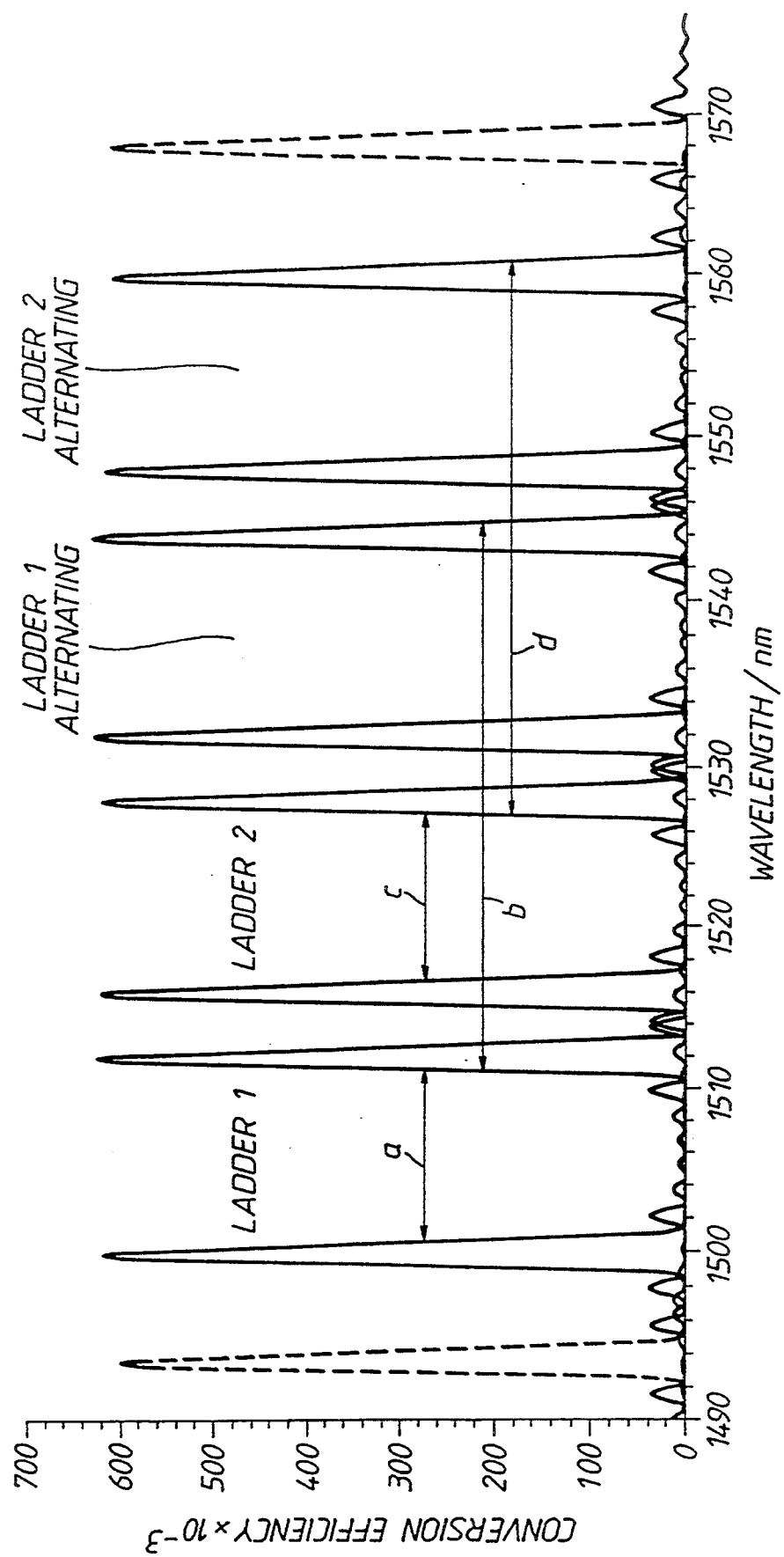
FIG. 5 shows the cumulative frequency response and the tuning range that can be provided by a filter according to the invention.

The combined effect of the features shown in FIGS. 1, 2 and 3 can be shown by the frequency response diagram of FIG. 5. Thus, for example, with a positive bias applied to both of lines $13_1$ and $14_1$ and with lines $13_2$ and $14_2$ unbiased such that the rungs $6_2$ of the second ladder are inoperative, arrow a in FIG. 5 shows the range over which the response can be pulled by adjustment of the bias voltage applied to line 15. Arrow b shows the effect of providing opposite polarities on lines $13_1$ and $14_1$. Arrow c shows the effect of removing the control voltage from lines $13_1$ and $14_1$ and applying control voltages of the same polarity to lines $13_2$ and $14_2$, while varying the control voltage applied to line 15 controlling the phase shifter elements 10. Arrow d shows the effect of reversing the polarity of the control signal applied to one of lines $13_2$ or $14_2$. It can be seen that a combination of the two features results in a filter which can be tuned over a wavelength range of approximately 60 nm.

We claim:

1. An optical filter comprising a light waveguide and an electrode structure located adjacent the waveguide, the electrode structure comprising:

a first ladder arrangement having a plurality of rungs disposed along the length of the waveguide and spaced apart from each other by a first pitch spacing, each rung of the first ladder arrangement comprising a plurality of interdigitated electrode pairs; and a second ladder arrangement having a plurality of rungs interleaved with the rungs of the first ladder arrangement and said rungs of said second ladder being spaced apart from each other by a second pitch spacing that is different from the first pitch spacing.

2. The optical filter according to claim 1, wherein the electrode structure further includes means for applying different control voltages to different rungs of at least one of the first and second ladder arrangements.

3. The optical filter according to claim 1, wherein the electrode structure further includes means for applying different control voltages to adjacent rungs of at least one of the first ladder arrangement and the second ladder arrangement.

4. The optical filter according to claim 1, and further including means for applying a control voltage to the rungs.

5. The optical filter according to claim 1, further including means for applying control voltages of opposite polarity to adjacent rungs.

6. The optical filter according to claim 1, and further including means for applying a control voltage of zero volts to alternate rungs.

7. The optical filter according to claim 1, and further including means for applying an identical control voltage to each rung.

8. The optical filter according to claim 1, and further including phase shift electrodes disposed between adjacent rungs.

9. The optical filter according to claim 1, wherein each rung has a number of electrode pairs that is greater within rungs disposed towards a center of the electrode structure than those towards an end of the electrode structure.

* * * * *